Dec. 20, 1949     G. A. LYON     2,491,502
WHEEL COVER
Filed Feb. 22, 1945
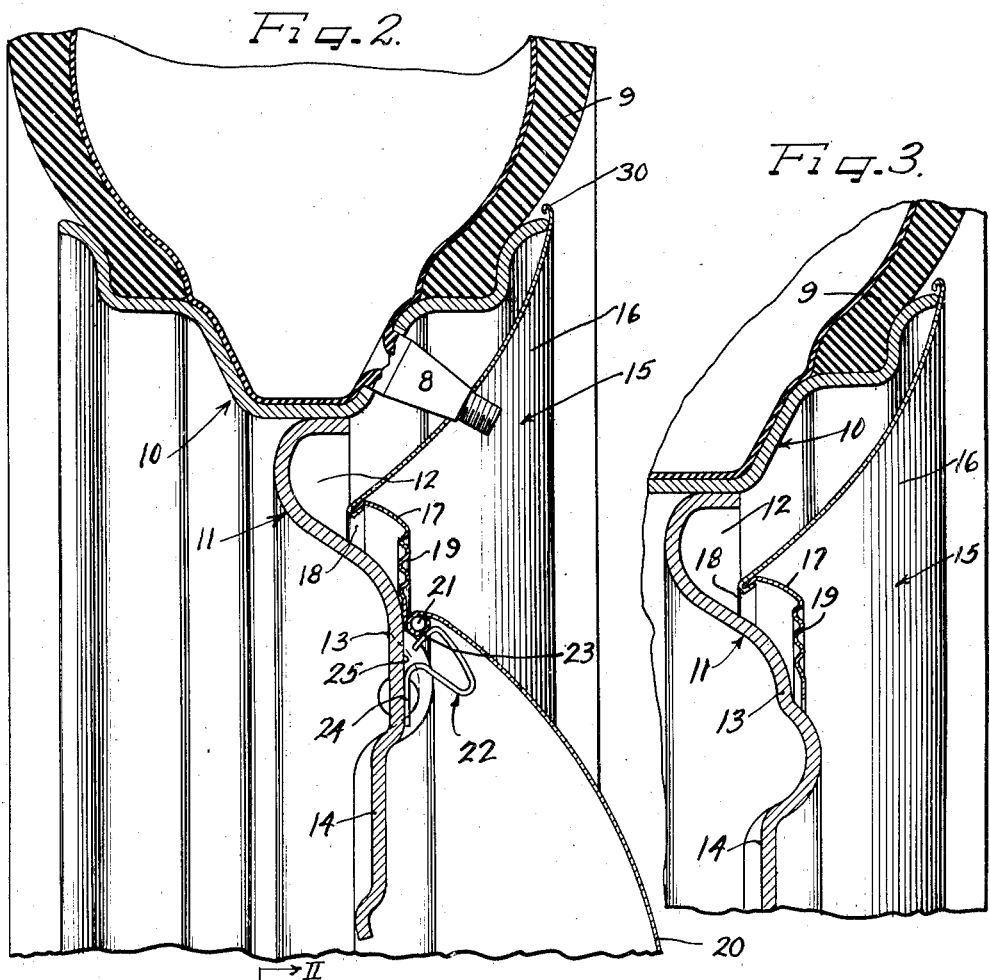
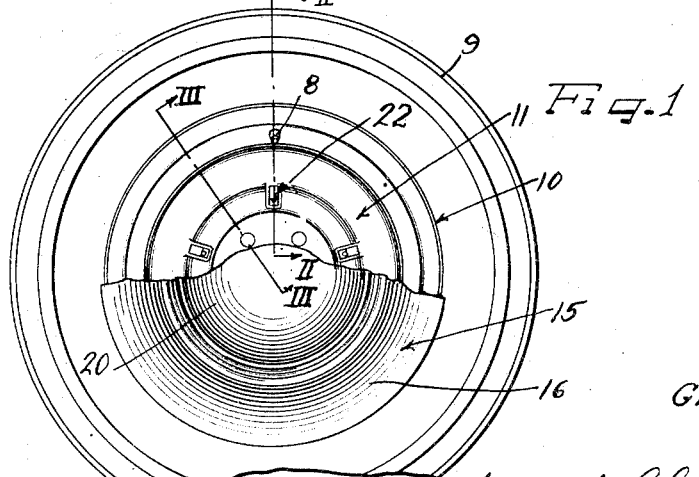
Inventor
GEORGE ALBERT LYON
by The Firm of Charles W. Hills, Attys.

Patented Dec. 20, 1949

2,491,502

UNITED STATES PATENT OFFICE 2,491,502

WHEEL COVER

George Albert Lyon, Allenhurst, N. J.

Application February 22, 1945, Serial No. 579,262

17 Claims. (Cl. 301—37)

This invention relates to a wheel structure and more particularly to a novel metal cover therefor.

An object of this invention is to provide a multi-part metallic cover for an automobile wheel which lends itself to economical manufacture on a large production basis.

Another object of this invention is to provide a metallic cover for a wheel which will more readily adjust itself to manufacturing variations in the parts of the wheel.

Still another object of this invention relates to the provision of such flexibility in a metal cover that the cover can be flexed in its application to a wheel to accommodate manufacturing variations in the relative locations of the body and rim parts of the wheel.

Yet another object of this invention resides in the provision of a multi-part wheel cover including two interconnected concentric rings and a central hub cap, the latter of which may be fabricated from the blank in the center of the outer ring and the inner ring of which may be economically rolled from strip stock.

A further feature of the invention relates to the provision of a wheel structure which includes a body part specially fabricated to accommodate my novel wheel cover which is of a construction such as to augment the appearance of the ornamented wheel.

In accordance with the general features of this invention there is provided in a cover structure for a wheel, including a multi-flanged rim part for a tire and a body part having an indentation radially inside of the base flange of the rim part and also having cover retaining means, a wheel cover comprising concentric interconnected rings, the outer of which extends radially and axially inwardly from an outer edge of the rim part into said indentation and substantially covering exposed outer side flanges of the rim part and the inner of which is connected to a radially inner margin of the outer ring in the indentation and extends substantially radially inwardly over the body part; there being also provided a hub cap in cooperation with the cover retaining means to clampingly retain the cover on the wheel in such a manner that the inner cover ring may be flexed or deflected laterally into tight cooperation with the body part.

Still another feature of the invention relates to the forming of the inner ring of the multi-ring cover of my invention in the form of a flexible diaphragm which will readily yield when subjected to the pressure of the hub cap.

Yet another feature of the invention relates to the formation of the outer ring of my cover of such configuration and size that the inner blank remaining after the forming of the ring from a sheet of stock may be utilized to form the hub cap there from.

A further feature of the invention relates to the provision of means for bridging the distance between the inner edge of the outer ring and the outer periphery of the hub cap which means is in the form of a relatively simple ring which may be economically manufactured on a large production basis from rolled strip stock.

A further feature of the invention relates to the provision of a combination cover-wheel body part structure wherein the cover and body part are so interrelated that the outer ring of the cover may extend a substantial distance inside of the body part and toward the medial plane of the wheel.

Other objects and features of this invention will more fully appear from the following detail description taken in connection with the accompanying drawings which illustrate a single embodiment thereof and in which Figure 1 is a side view of a wheel assembly embodying the features of this invention and partly broken away to show the construction of the body part of the wheel;

Figure 2 is an enlarged fragmentary cross-sectional view taken on the line II—II of Figure 1 looking in the direction indicated by the arrows; and Figure 3 is an enlarged fragmentary cross-sectional view similar to Figure 2 but taken on the line III—III of Figure 1 looking in a direction indicated by the arrows with the hub cap omitted.

The reference character 9 designates generally a conventional automobile tire which is supported in a conventional drop center type tire rim 10 through one of the flanges of which projects the usual valve stem 8. The tire rim 10, as is well known in the art, embraces a plurality of lateral flanges interconnected by a base flange which base flange is suitably fastened to a load bearing or body part 11 which comprises a metallic stamping.

In accordance with the features of my invention this body part 11 is so constructed that it will better cooperate with the cover in causing the cover to extend further toward the medial plane of the wheel and tire. In accomplishing this I form the cover with an outer depressed portion or indentation 12 which is located directly radially inwardly of the base flange of the tire rim. The body part 11 also includes an outwardly curved dished portion 13 and a central bolt-on flange 14 for fastening in the usual way by wheel bolts to a supporting member on the axle of the vehicle. It will be perceived from Figure 2 that the body part 11 in reality has a cross-sectional shape which closely resembles an S.

Cooperable with these wheel parts 10 and 11 is a cover structure 15 embracing the features of this invention which includes outer and inner metal rings 16 and 17. These concentric interconnected metal rings cooperate with a central metallic hub cap 20 in substantially covering the exposed outer surfaces of the rim and body parts of the wheel.

The outer ring 16 is of a generally curved convex cross-sectional shape and extends radially and axially inwardly from an outer edge of the rim part 10 to a point located substantially in or adjacent the indentation 12 in the body part 11. It will also be noted from Figure 2 that this section 16 may be suitably apertured to accommodate the valve stem 8.

By reason of the curvature and depth of the ring 16 and the fact that its outer edge is in close proximity to the side wall of the tire 9, this ring in use will appear to constitute a continuation of the side wall of the tire. As a matter of fact, if the outer surface of this ring 16 is given a white finish it in use, appears to constitute a white side wall portion of the tire.

The inner ring 17 is also of a convex cross-sectional shape and has its outer edge turned back slightly upon itself in the same general direction as the inner portion of the ring 16 and is secured to the ring 16 by the inner edge of the ring being turned back at 18 thereon. In other words, the two rings are fastened together by means of a lock seam.

The inner ring 17 constitutes a very important feature of the present invention and is purposely formed so that it has a diaphragm-like action in use. I accomplish this by providing the ring with a generally flat portion 19 which is normally slightly spaced from the body part so that it must be deflected axially when the hub cap 20 is applied to the wheel. This flattened diaphragm portion 19 may be corrugated, as illustrated, to augment its resiliency.

In practice I find that by forming the ring with a flat crown or outer portion 19 that this portion is easily deflectable laterally upon slight pressure thereagainst such as the pressure of the hub cap. Moreover, the pressure needed to deflect it against the body part 11 is so slight that it does not in use exert such force on the hub cap as would tend to dislodge the hub cap from its retaining cooperation with the spring clips 22.

The hub cap 20 has a turned or rolled outer edge 21 which is of such a diameter as to bear against the inner edge of the ring 19 and is also so formed that it can be cammed over the inclined extremities 23 of the spring clips 22. These spring clips 22 are of a type that I have now commercialized in the trade and which is commonly referred to as an inverted type of spring clip. These clips may be of any suitable number, such for example as three to five, and are arranged in a common circle about the axis of the wheel. Each of the clips includes a base leg 24 to be disposed in a depression 25 in the body part 11 and suitably fastened as by means of rivets or bolts to the body part.

It will be observed that the depressions 25 are grooves that radially intersect the extreme axially outer annular protruding bulge of the wheel portion 13 and the respective clip base legs 24 are held by the walls of the respective depressions against any substantial turning out of proper hub cap retaining position. The inclined hub cap retaining extremities 23 of the clips project radially outwardly beyond the radially outer side of the groove-intersected annular wheel body bulge which provides a shoulder opposing the inner edge of the diaphragm portion 19 of the cover member 17 and thereby maintains the cover 15 substantially concentric with the wheel while the bead 21 of the hub cap is pressed by the clips 22 against the inner margin of the diaphragm portion 19 and thereby clamps it against the body portion where the latter extends generally radially beyond the bulge shoulder.

In the application of this cover it is first aligned with the wheel so that the aperture in it can be brought into register with the valve stem 8 and then it is pressed axially toward the wheel until its outer turned edge 30 bears against the outer edge of the rim part 10. This position of the metallic cover 15, comprising the ring 16 and 17 is illustrated in Figure 3, from which it will be seen that the diaphragm section 19 is out of engagement with the portion 13 of the body part 11.

Thereafter the hub cap 20 is aligned with the center part of the wheel so that its turned edge 21 bears against the extremities 23 of the spring clips 22. By exerting a slight pressure on the hub cap 20 in a direction toward the wheel it is easily cammed over the spring clips to tight tensioned retaining cooperation with the wheel structure. During this operation the rolled edge 21 deflects the inner edge of the diaphragm section 19 toward and into tight engagement with the body part.

It is known in the wheel art that in the fabrication of the parts 10 and 11 of the wheel considerable tolerance is allowed in their relative locations. As a consequence where a cover is to bear on both of these parts or, in other words, the cover is to have a two point contact with the wheel, it is not feasible to properly fit the cover to all wheels unless provision is made in the cover to accommodate the manufacturing variations. I accomplish this by normally allowing the inner portion of the ring structure, which is to bear against the wheel to be slightly spaced from the wheel. Thereafter this spaced portion is pressed tightly against the wheel under resilient tension and as a consequence accommodates the allowable manufacturing tolerance.

I find that a cover assembly of excellent appearance may be provided by finishing the outer surface of the ring 16 in white, the intermediate or inner ring 17 in color and the hub cap with a lustrous external finish. However, if it is so desired the inner ring 17 may be given a lustrous finish and the hub cap 20 may have its external surface painted to match the color of the body of the vehicle.

The cover assembly of my present invention lends itself to economical manufacture on a large production basis. For example, both the ring 16 and the hub cap 20 may be blanked from a common sheet. That is to say the center part of the ring, which would be normally waste, can be used to make a hub cap 20. However, due to the turned inner edge of the ring 16 and the turned edge 21 of the hub cap, it will be appreciated that there will be a gap between these edges in the assembly. For this reason and in order to provide complete coverage for the body part of the wheel I utilize an inner ring 17 to bridge the gap. This inner ring need not be of metallic stamping but may be rolled from strip stock so that there will be no waste such as would be present if it were blanked from sheet stock. Then, too, the inner ring 17 may be made of a springier steel than either the ring 16 or the hub cap 20 if the same is so desired. I contemplate that this inner ring 17 may be made of stainless steel and this is particularly desirable where a lustrous finish is desired for this ring. The essential thing, however, is that the ring 17 be made of such metal that it will have the diaphragm action which I have described hereinabove.

In conclusion it should be further noted that by reason of the inner edge margin of the outer band or ring 16 extending further into the wheel body part 11, I am enabled to bring the ring closer to the flanges of the tire rim 10 thereby enabling the valve stem to project through the hole in the ring 16 without having to be lengthened. In other words, it is possible to use a shorter valve stem than would be feasible if the ring 16 was spaced further away from the tire ring flanges. In addition, this structure permits of a larger expanse of the so-called white side wall as well as enables the white side wall to appear more nearly like a continuation of the tire side wall. All of this is accomplished without necessitating any change in the brake drum or in the manner of fastening the wheel to the brake drum.

In the actual use of my invention, the ensuing deep curvature of the outer white side wall ring 16 enables an optical effect wherein the tire appears to have a substantially rounded cross-section, as well as appears to be quite massive.

All of the foregoing is accomplished by the simple change made in indenting the wheel body part or spider and without any other changes in the wheel itself or its mounting.

I claim as my invention:

1. In a cover structure for a wheel including a multi-flanged rim part for a tire and a body part having an identation radially inside of the base flange of the rim part and also having cover retaining means, a wheel cover comprising concentric interconnected metal rings, the outer of which extends radially and axially inwardly from an outer edge of the rim part into said indentation and substantially covering exposed outer side flanges of the rim part and the inner of which is connected to a radially inner margin of said outer ring in said indentation and extends substantially radially inwardly over said body part, and a hub cap in cooperation with said cover retaining means to clampingly retain said cover on the wheel, said inner cover ring having a flattened diaphragm-like section with an inner edge deflectable axially by the hub cap into tight engagement with said body part, the hub cap being in engagement edgewise with the inner cover ring and having its edge formed with an inwardly directed bead adapted to be engaged by securing means to press the bead and thereby the hub cap toward the body part and clamp the interposed diaphragm-like section of the inner cover ring against the body part.

2. In a cover structure for a wheel including a multi-flanged rim part for a tire and a body part having an identation radially inside of the base flange of the rim part and also having cover retaining means, a wheel cover comprising concentric interconnected metal rings, the outer of which extends radially and axially inwardly from an outer edge of the rim part into said indentation and substantially covering exposed outer side flanges of the rim part and the inner of which is connected to a radially inner margin of said outer ring in said indentation and extends substantially radially inwardly over said body part, and a hub cap in cooperation with said cover retaining means to clampingly retain said cover on the wheel, said inner cover ring being formed from a springier material than the outer ring and hub cap and having a flattened diaphragm-like section with an inner edge deflectable axially by the hub cap into tight engagement with said body part, said outer ring and hub cap comprising stampings adapted to be derived from a common blank with the inner edge of the hub cap rolled upon itself and said inner ring bridging the gap between the inner edge of the outer ring and the turned outer edge of the hub cap.

3. The structure of claim 2 further characterized by the inner ring comprising an annulus rolled from strip stock of convex concave cross-section.

4. The structure of claim 1 further characterized by the inner ring having corrugations to augment its diaphragm action.

5. In a cover structure for a wheel including rim and body parts, a cover for substantially covering exposed flanges of the rim part and the body part comprising concentric radially inner and outer metal rings with their adjoining margins fastened together, said inner ring being formed with a concave convex portion extending axially outwardly and radially inwardly and a flattened diaphragm portion extending generally radially inwardly from the concave convex portion and adapted for transverse flexing in the securing of the cover to one of the wheel parts.

6. In a cover structure for a wheel including rim and body parts, a cover for substantially covering exposed flanges of the rim part and the body part comprising concentric radially inner and outer metal rings with their adjoining margins fastened together, said inner ring being formed with a concave convex portion extending axially outwardly and radially inwardly and a flattened diaphragm portion extending generally radially inwardly from the concave convex portion and adapted for transverse flexing in the securing of the cover to one of the wheel parts, and a hub cap for deflecting the diaphragm portion of said inner ring into tight retained cooperation with the body part of the wheel.

7. In a cover structure for a wheel including rim and body parts, a cover for substantially covering exposed flanges of the rim part and the body part comprising concentric radially inner and outer metal rings with their adjoining margins fastened together, said inner ring being formed with a concave convex portion extending outwardly and radially inwardly and a flattened diaphragm portion extending generally radially inwardly from the concave convex portion and adapted for transverse flexing in the securing of the cover to one of the wheel parts, said outer ring being of generally curved convex cross-sectional contour and extending radially and axially inwardly from the outer edge of the rim part to a position over the body part so as to appear in use to be a continuation of the side wall of the tire.

8. In a cover structure for a wheel including tire rim and body parts, a wheel cover for substantially concealing exposed portions of said parts including separately formed radially inner and outer metal rings, the outer of which is formed from relatively rigid material and the inner of which is formed from relatively resilient material said rings comprising divergent outer surfaces with the joint at their junction and said inner ring having a flattened portion extending generally radially inwardly from the joint to a point where it is transversely flexible diaphragm fashion under tension by a hub cap into clamped engagement with the body part.

9. In combination in a cover structure for a wheel including a tire rim and a body portion, a tire-rim-concealing outer cover ring of a cross section to extend radially and axially inwardly and being formed from relatively rigid material, an inner ring of relatively flexible material having an outer edge flange extending generally radially and axially inwardly and lying against the inner margin of the outer ring at its axially outer face, the inner edge of the outer ring being turned back upon itself into tight clamping engagement with said inner ring outer edge flange, said inner ring extending convexly and generally axially outwardly and radially inwardly from said outer edge flange divergently relative to said outer cover ring and having a substantially radially inwardly extending inner diaphragm portion adapted in the initial assembly with the wheel to lie in slightly spaced relation to the body portion of the wheel and being flexibly yieldable under resilient tension toward and into engagement with the body portion of the wheel in response to axially inwardly directed pressure exerted thereagainst by a hub cap member when the latter is assembled with the wheel.

10. In a wheel structure including a tire rim part and a body part, the body part having an annular axially outwardly bulging portion providing a generally radially outwardly facing shoulder radially outwardly beyond which a portion of the wheel body extends, an annular wheel cover comprising generally divergently related portions one of which extends in substantially concealing relation to the tire rim and the other of which extends generally radially inwardly and has the edge thereof adjacent to said shoulder whereby said shoulder operates to maintain the annular cover concentric with the wheel, said inner portion of the cover in the initial assembly of the wheel tending to remain spaced axially outwardly from said radially outwardly extending portion of the wheel body, and a hub cap member engaging said inner portion of the annular cover and pressing it diaphragm-like against the wheel body.

11. In a wheel structure including a tire rim part and a body part, the body part having an annular axially outwardly bulging portion providing a generally radially outwardly facing shoulder radially outwardly beyond which a portion of the wheel body extends, an annular wheel cover comprising generally divergently related portions one of which extends in substantially concealing relation to the tire rim and the other of which extends generally radially inwardly and has the edge thereof adjacent to said shoulder whereby said shoulder operates to maintain the annular cover concentric with the wheel, said inner portion of the cover in the initial assembly of the wheel tending to remain spaced axially outwardly from said radially outwardly extending portion of the wheel body, and a hub cap member engaging said inner portion of the annular cover and pressing it diaphragm-like against the wheel body, said annular bulge portion of the wheel body having a series of radial grooves therein and cover retaining clips mounted in said grooves and engaging said hub cap member to retain the latter in said pressing engagement with the radially inner portion of the annular cover member.

12. In a cover structure for a wheel including flanged tire rim and body parts, said body part having an identation adjacent the base of the tire rim and the medial plane of the tire, a wheel cover comprising an annulus having two concentric portions joined together in said indentation and extending substantially radially and axially outwardly therefrom in divergent directions, the outer one over the flanges of the rim part and the inner one over the body part and being provided with a flattened portion for clamping to the body part.

13. In a cover structure for a wheel including flanged tire rim and body parts and cover retaining means, said body part having an indentation adjacent the base of the tire rim and the medial plane of the tire, a wheel cover comprising an annulus having two concentric portions joined together in said indentation and extending substantially radially and axially outwardly therefrom in divergent directions, the outer one over the flanges of the rim part and the inner one over the body part and being provided with a flattened portion, and a hub cap held on the wheel by said cover retaining means and clampingly engaging said flattened portion to hold said cover on the wheel.

14. In a wheel structure, a wheel including tire rim and body parts and hub cap retaining means, said body part having an indentation adjacent the base of the tire rim and extending to a point in close proximity to the medial plane of the wheel and a wheel cover assembly including an outer annular wheel cover and a central hub cap for holding the cover on the wheel and cooperable with said retaining means, said wheel cover including a radially outer annular portion extending axially and radially from an outer edge of the rim into said indentation, and a ring attached in said indentation to the inner edge of said annular portion and having a radially inner flattened portion engageable by said hub cap to be clamped to the wheel body part.

15. In a cover structure for a wheel including flanged tire rim and body parts, said body part having an indentation adjacent the base of the tire rim and the medial plane of the tire, a wheel cover comprising an annulus having two concentric portions joined together in said indentation and extending substantially radially and axially outwardly therefrom in divergent directions, the outer one over the flanges of the rim part and the inner one over the body part and being provided with a flattened portion for clamping to the body part, said flattened portion being constructed so as to be similar to a diaphragm whereby it may be flexed axially toward the body part.

16. In a cover structure for a wheel including flanged tire rim and body parts and cover retaining means, said body part having an indentation adjacent the base of the tire rim and the medial plane of the tire, a wheel cover comprising an annulus having two concentric portions joined together in said indentation and extending substantially radially and axially outwardly therefrom in divergent directions, the outer one over the flanges of the rim part and the inner one over the body part and being provided with a flattened portion, and a hub cap held on the wheel by said cover retaining means and clampingly engaging said flattened portion to hold said cover on the wheel, said flattened portion defining a seat for the hub cap and comprising a resilient diaphragm deflectable toward the body part by the hub cap into tensioned engagement with the body part.

17. In a cover structure for disposition at the outer side of a vehicle wheel including a tire rim and a wheel body having an outwardly projecting annular intermediate bulging portion, with an outwardly opening annular groove defined between the tire rim and said intermediate bulging portion, a cover annulus of a width to bridge the groove and including concentric inner and outer annular portions divergently related and having an annular inwardly extending rigidifying juncture accommodated in said groove, said outer portion of the cover annulus overlying the tire rim, and said inner portion of the cover annulus overlying the wheel body and comprising a flattened radially inner portion of a width to extend from adjacent to said juncture into spaced overlying relation at its inner extremity to the outwardly bulging wheel body portion, said flattened portion being flexibly deflectable diaphragm-like and yielding responsive to light inward flexing pressure by a hub cap retained on said wheel body to engage the inner extremity of the flattened flexible portion against said outwardly bulging body portion.

GEORGE ALBERT LYON.

REFERENCES CITED

The following references are of record in the file of this patent:

UNITED STATES PATENTS

| Number | Name | Date |
| --- | --- | --- |
| 2,190,669 | Lyon | Feb. 20, 1940 |
| 2,217,116 | Hunt et al. | Oct. 8, 1940 |
| 2,239,366 | Lyon | Apr. 22, 1941 |
| 2,326,788 | Lyon | Aug. 17, 1943 |
| 2,333,626 | Aske | Nov. 9, 1943 |
| 2,368,232 | Aske | Jan. 30, 1945 |